United States Patent
Koinuma et al.

(10) Patent No.: US 7,685,168 B2
(45) Date of Patent: Mar. 23, 2010

(54) REMOVING WEB APPLICATION FLICKER USING AJAX AND PAGE TEMPLATES

(75) Inventors: Masabumi Koinuma, Waltham, MA (US); Jianjun Zhang, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 11/848,847

(22) Filed: Aug. 31, 2007

(65) Prior Publication Data

US 2009/0063499 A1 Mar. 5, 2009

(51) Int. Cl.
*G06F 17/30* (2006.01)
(52) U.S. Cl. ........................ 707/200; 707/203; 709/223; 709/224
(58) Field of Classification Search ......... 707/200–203; 709/223–224
See application file for complete search history.

(56) References Cited

U.S. PATENT DOCUMENTS

| | | | |
|---|---|---|---|
| 6,886,012 B1 * | 4/2005 | Phoenix et al. | 707/8 |
| 2007/0136417 A1 * | 6/2007 | Kreiner et al. | 709/203 |
| 2008/0010341 A1 * | 1/2008 | Curtis et al. | 709/204 |
| 2008/0028302 A1 * | 1/2008 | Meschkat | 715/255 |
| 2008/0320050 A1 * | 12/2008 | Chan | 707/200 |
| 2009/0125799 A1 * | 5/2009 | Kirby | 715/234 |

* cited by examiner

*Primary Examiner*—Don Wong
*Assistant Examiner*—Hanh B Thai
(74) *Attorney, Agent, or Firm*—Jeanine S. Ray-Yartletts; Dillon & Yudell, LLP

(57) ABSTRACT

A web page is rendered under the control of a client. A content server divides a webpage in multiple empty partitions. Each of the partitions has an associated pointer to data that can populate the partition. When data changes, the content server transmits pointers for all data for all of the partitions, including new pointers to new changed data. If an old pointer to old data is the same as a new pointer to the new data, the client ignores the new pointer. If the new pointer and the old pointer are different, then the client uses the new pointer to obtain the new data for that particular partition.

20 Claims, 5 Drawing Sheets

REMOVING WEB APPLICATION FLICKER USING AJAX AND PAGE TEMPLATES

BACKGROUND OF THE INVENTION

The present invention relates in general to data processing systems and in particular to computer software. Still more particularly, the present invention relates to an improved method and system for asynchronously updating webpage content.

A webpage is a document found on the World Wide Web that can be accessed through a web browser. This webpage is usually written in HyperText Markup Language (HTML), and is retrieved from a web server using Hypertext Transfer Protocol (HTTP). Typically, web pages are made up of static text that is served by the web server. An improvement to HTTP is Asynchronous JavaScript And eXtensible Markup Language (AJAX), which is a development technique for creating interactive web applications that makes web pages feel more responsive by exchanging small amounts of data between a web page and a web server, and for making page user interface updates incrementally without having to reload the entire page.

Java is an object-oriented programming language, which utilizes high-level syntax derived from C and C++, but includes a simpler object model with fewer low-level facilities. Java programs are typically compiled into "bytecode", which can either be interpreted at run time or compiled into native machine code for execution. Java programs utilize configurable security features to enable selective restriction of network and/or file access operations. AJAX utilizes a client side script language, such as JavaScript, along with eXtensible Markup Language (XML) to enable the creation of the initial conditions for the evolution of dynamic, intuitive, complex, and data-centric user interfaces in web pages. AJAX thus increases the speed, interactivity, and ease-of-use of web pages.

SUMMARY OF THE INVENTION

A web page is rendered under the control of a client. A content server divides a webpage in multiple empty partitions. Each of the partitions, which in one embodiment include parent-child object structural relations between one another, has an associated pointer to data that can populate the partition. When data changes, the content server transmits pointers for all data for all of the partitions, including new pointers to new changed data. If an old pointer to old data is the same as a new pointer to the new data for a particular partition, the client ignores the new pointer. If the new pointer and the old pointer are different, then the client uses the new pointer to obtain the new data for that particular partition.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

Figure 1:
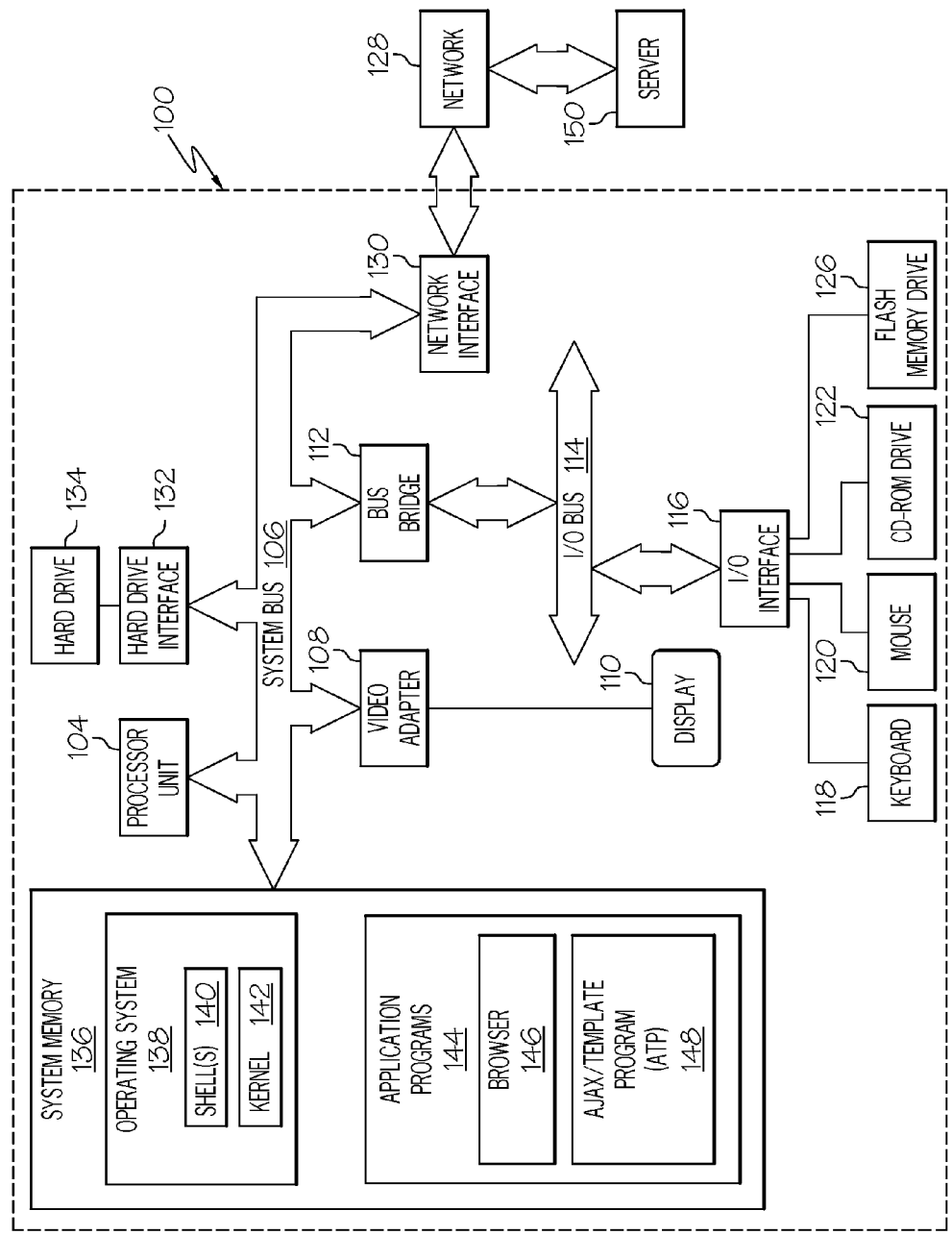
FIG. 1 depicts a high level block diagram of an exemplary computer, according to an embodiment of the present invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the client's computer, partly on the client's computer, as a stand-alone software package, partly on the client's computer and partly on a remote computer or entirely on the remote computer or server. In the latter scenario, the remote computer may be connected to the client's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a AJAX/Template Program (ATP) 148. ATP 148 performs the functions illustrated below in FIGS. 2-5.

In one embodiment, computer 100 is able to download ATP 148 from service provider server 150, preferably in an "on demand" basis. In another embodiment, service provider server 150 performs all of the functions associated with the present invention (including execution of ATP 148), thus freeing computer 100 from using its own resources.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

As described below, the present invention utilizes the Asynchronous JavaScript And eXtensible Markup Language (AJAX), which utilizes Java. AJAX is a development technique for creating interactive web applications that makes web pages feel more responsive by exchanging small amounts of data between a web page and a web server and making page user interface updates incrementally, without having to reload the entire page. Java is an object-oriented programming language, which utilizes high-level syntax derived from C and C++, but includes a simpler object model with fewer low-level facilities. Java programs are typically compiled into "bytecode", which can either be interpreted at run time or compiled into native machine code for execution. Java programs utilize configurable security features to enable selective restriction of network and/or file access operations. AJAX utilizes a client side script language, such as JavaScript, along with eXtensible Markup Language (XML) to enable the creation of the initial conditions for the evolution of dynamic, intuitive, complex, and data-centric user interfaces in web pages. AJAX, and particularly when used with a page template as described below, increases the speed, interactivity, and ease-of-use of web pages. However, without the present invention, AJAX alone causes page flicker while navigating web pages, and reduces performance levels of interactivity.

As described in detail below, the present invention splits page content into multiple files (e.g., common header/footer, navigation bar, page layout and styles, body content). Some of these multiple files can have configurable areas which are later filled by other files. When a client requests a web page (or a web page update), the multiple files are sent to the client from a web server. The client aggregates the files into a single web page, which is initially unpopulated with data, which is later sent to the client. Thus, there are two main steps. The first step is for the web server to send the client an Extensible Markup Language (XML) file that has only structural information such as 1) files that are to be consumed by the requested page; 2) assigned area names for each file; and 3) parent-child relationships between files. The second step has the client using JavaScript to parse the structural information, compare it with a current page (in the case of a web page update), and then return requests for only new data from the server. The client preferably uses an asynchronous request in the form of XMLHttpRequest to get the actual content based on the pointers. It is significant to note that the present invention is different from and not suggested by a Struts-Tiles type of web page rendering since it is the client (through the use of client-control script) that controls which new data is requested/received, while Struts-Tiles empowers only the web server to determine which new data is to be sent to the client. Thus, the present invention provides a much needed improvement over the prior art by allowing local control and scalability on the client side.

Figure 2:
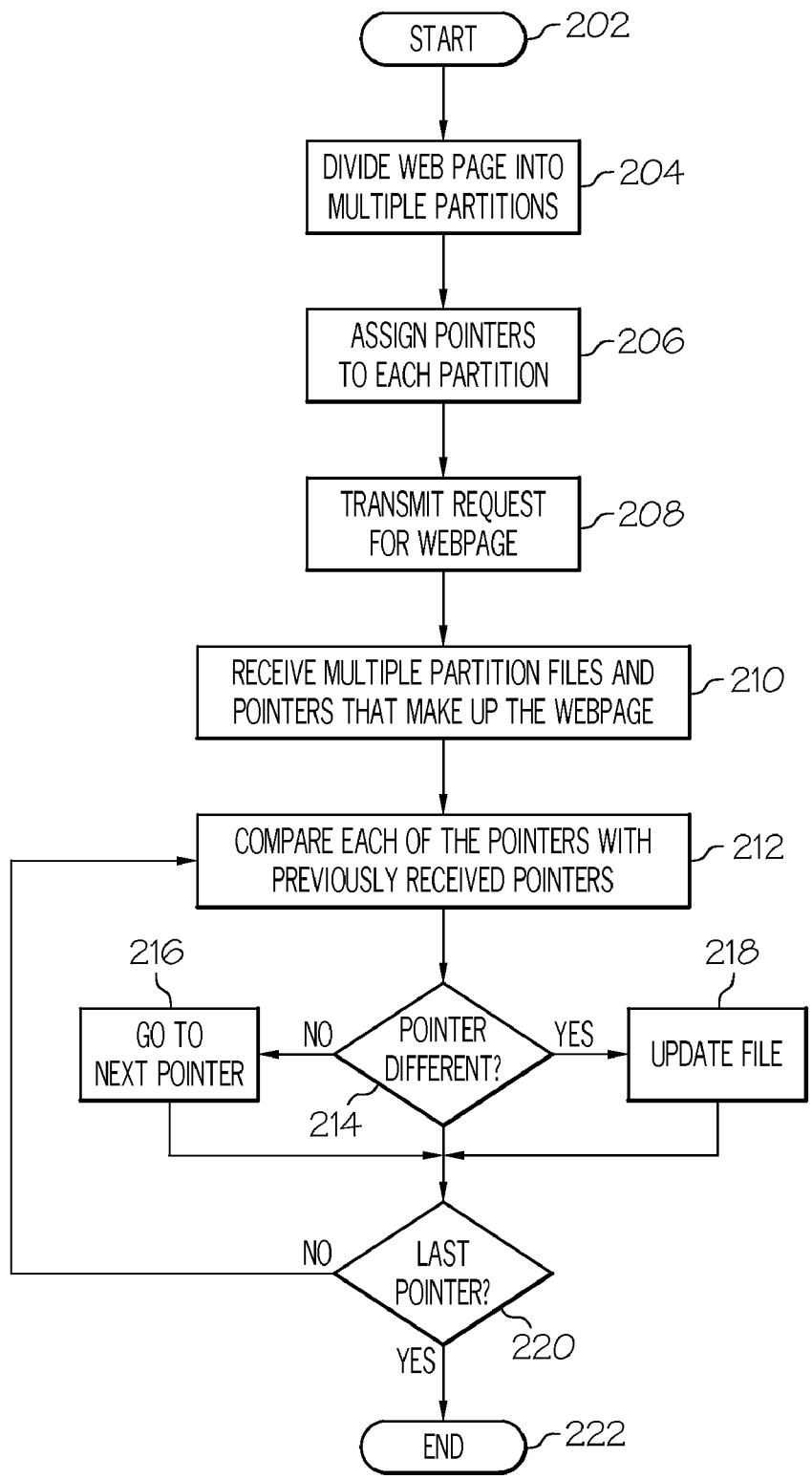
FIG. 2 is a high-level flow-chart of exemplary steps taken in accordance with the present invention to create and manage a web page.

With reference now to FIG. 2, a high-level flow-chart for rendering and updating a web page on a client's side. To create the initial web page (initiator block 202), a shell of multiple empty partitions is created by dividing up the framework of the web page (block 204). In one embodiment, the partitions may have a parent-child relationship among one another. That is, one partition may be the child of a parent object, thus providing inheritance and other object oriented language benefits of a parent/child relationship. Note that there are preferably two types of partitions in the webpage: configurable and non-configurable. The configurable partitions are later populated (filled) with data in a manner described below. The non-configurable partitions are fixed with data at the time of creation, and cannot be reconfigured with new data at a later time. Exemplary uses of non-configurable partitions include, but are not limited to, tool bars, menus, enterprise logos, etc. A web server then creates multiple initial pointers for the multiple empty partitions, and designates a different pointer (that points to a data location) for each partition (block 206). The client (i.e., either the web browser or JavaScript code transmitted as part of the initial response from the server) can then request the framework (multiple empty partitions) and data (pointers) from the web server (block 208) to render the webpage. The client receives the empty partitions and pointers to render the webpage (block 210) to create the initial version web page. Thereafter, when the client requests and receives data pointers, he compares these updated pointers with previously used pointers (block 212). If they are the same (query block 214), then the next pointer file for the web page is examined (block 216). However, if the pointer is different, then the data file for that partition of the web page is updated via a request from the client for only that data file (block 218). The process continues in an iterative manner until the last updated pointer is received (block 220), indicating that the web page has been appropriately updated (terminator block 222). Thus, the client is in control of what data is sent from the web server, since the client only requests data to pointers that have changed.

Figure 3:
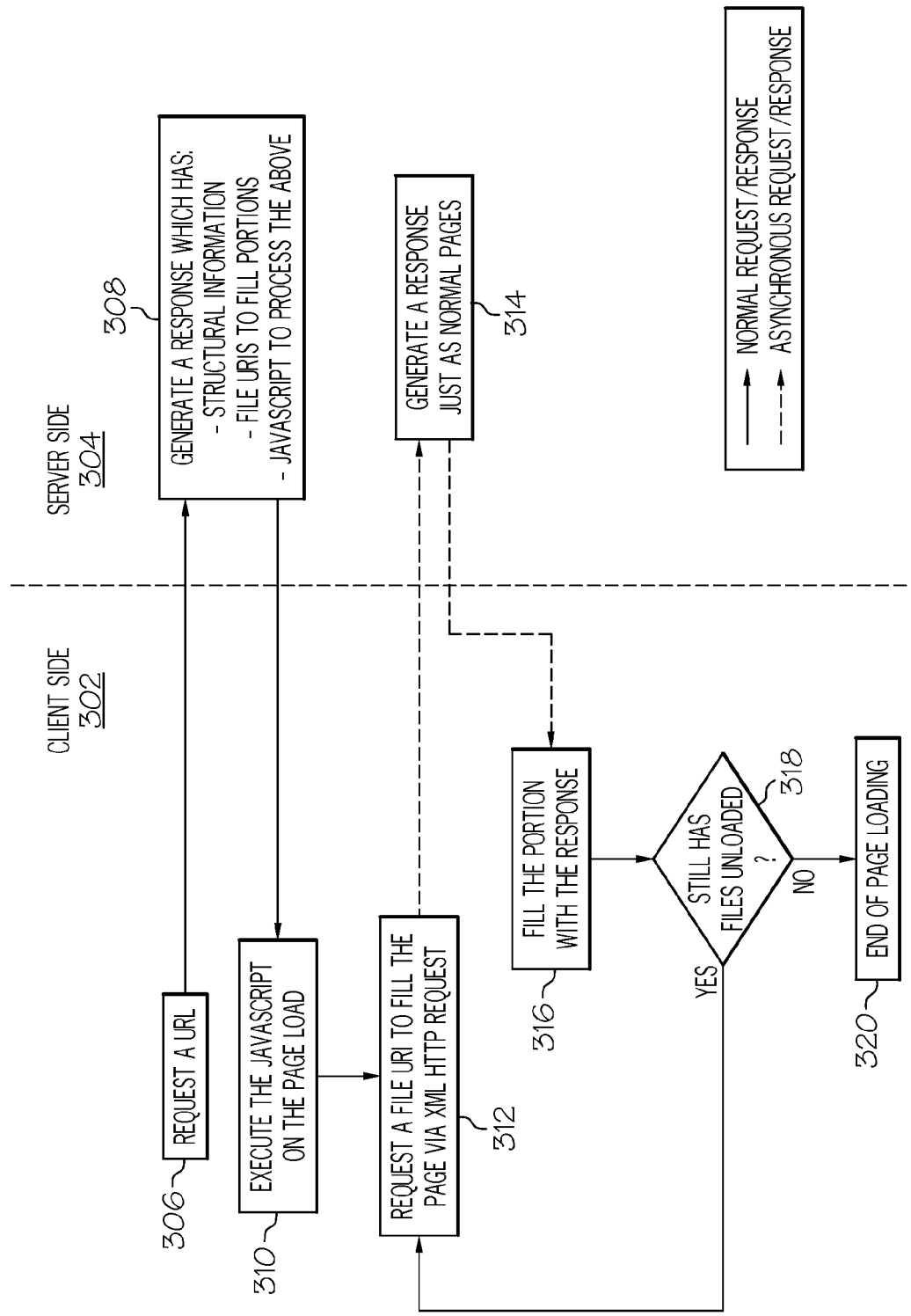
FIG. 3 is a more detailed flow-chart showing steps taken to handle in incoming request for updated data in a web page.

Referring now to FIG. 3, a flow-chart (using a modified swim-lane format) depicts exemplary steps taken to initially create and then maintain a web page on the client's side. The process operates both in a client side 302 and a server side 304. As shown in block 306, the client requests a web page at a particular Uniform Resource Locator (URL). This request is sent to the server, which generates a response that has 1) structural information (framework composed of empty partitioned parts of the web page); 2) Uniform Resource Indicators (URIs), or pointers, for locating data to populate the partitions of the web page; and 3) JavaScript that the client can use to process the structural information and data pointers (block 308).

Note that at the step described in block 308, the server does not return actual data, but rather returns file URIs that point to the needed data. Exemplary pseudocode for this step includes:

```
<script type="text/javaScript" src="ajaxTemplate.js"></script>
<div id="template" ajaxTemplateHref="template.jsp">
    <div id="area1" ajaxTemplateHref="pageBody_area1.jsp"></div>
    <div id="area2" ajaxTemplateHref="pageBody_area2.jsp"></div>
</div>
```

The client then executes the JavaScript (block 310), which results in an asynchronous request of data (using the pointer/URI) needed to populate a particular partition of the webpage (block 312). Exemplary pseudocode for performing this step includes:

```
<html>
    <body>
        <h1>Page header</h1>
        <table><tr>
            <td><div ajaxTemplateName="area1">
                <!-- filled by the file specified in the first response -->
            </div></td>
            <td><div ajaxTemplateName="area2">
                <!-- filled by the file specified in the first response -->
            </div></td>
        </tr></table>
        <h5>Page Footer</h5>
    </body>
</html>
```

The server responds with the requested data (block 314) such that the requested data populates the particular partition (block 316). The process continues in an iterative manner (query block 318) until the entire page has been rendered or updated (block 320).

For example, assume that the client has a current page that consists of: A.jsp, B.jsp and C.jsp, such that exemplary pseudocode would be:

```
<div id="template" ajaxTemplateHref="A.jsp">
    <div id"area1" ajaxTemplateHref="B.jsp"></div>
    <div id"area2" ajaxTemplateHref="C.jsp"></div>
</div>
```

Also assume that a new requested page consists of: A.jsp, BB.jsp and C.jsp, as suggested by the pseudocode of:

```
<div id="template" ajaxTemplateHref="A.jsp">
    <div id="area1" ajaxTemplateHref="BB.jsp"></div>
    <div id="area2" ajaxTemplateHref="C.jsp"></div>
</div>
```

Since only BB.jsp has changed, then that is the only portion that the client will asynchronously change. Note that each page can control whether a portion always need to be updated using tag attributes such as:

```
<div id="area1" ajaxTemplateHref="navigation.jsp" volatile="true">
</div>
```

Figure 4:
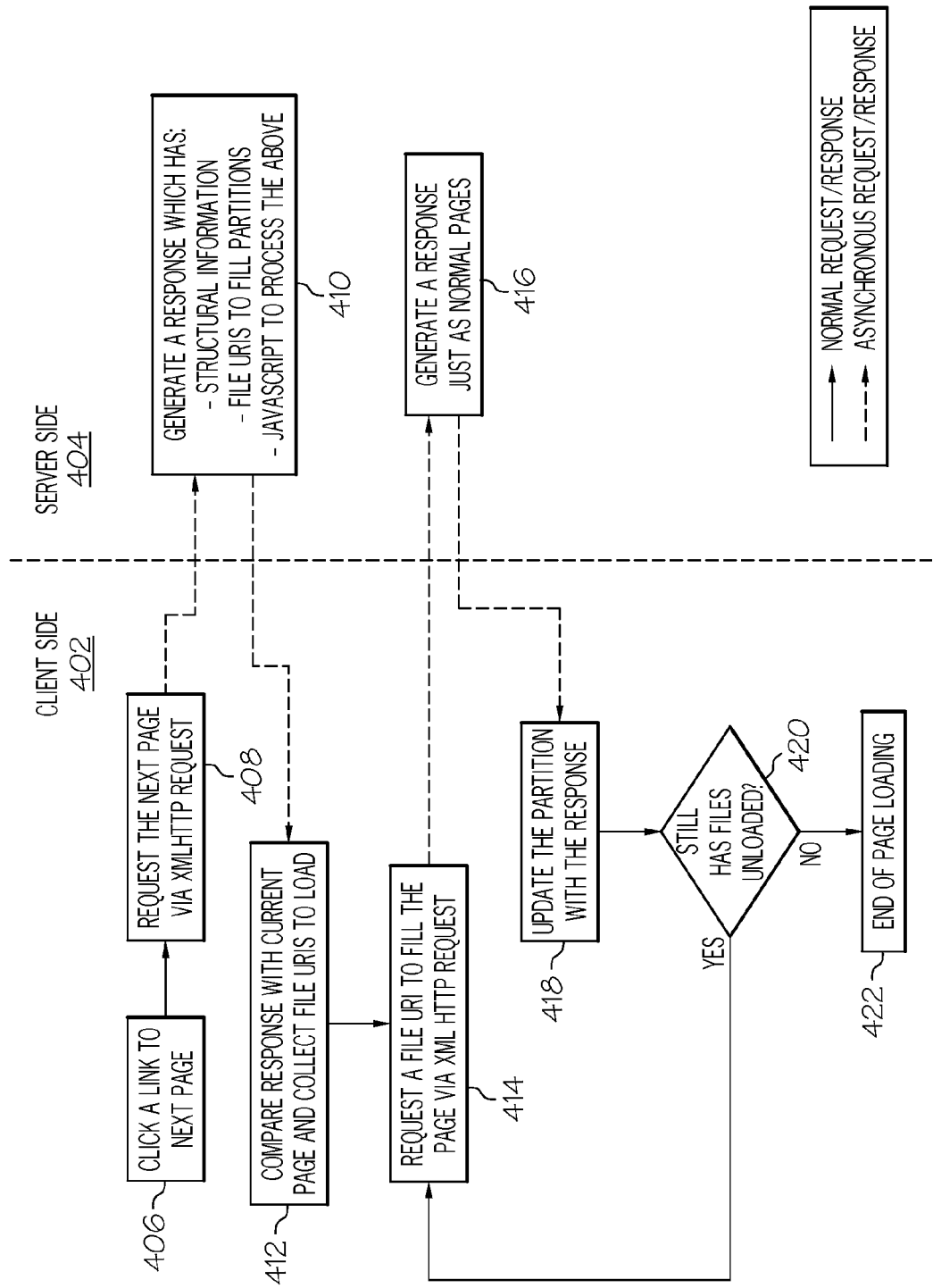
FIG. 4 is a flow-chart depicting steps taken to update data during page navigation.

Referring now to FIG. 4, a swim-lane flow chart of steps taken when the client is navigating through a web page is presented. Again, operations take place on a client side 402 and a server side 404. When the client clicks a link to a next page (block 406), he sends an XMLHttpRequest for that next page to the server (block 408). This request is sent as an AJAX request, except that the identifier (ID) for the next page and the file URI (pointer) on which the form and data reside are kept on the client side 402 by JavaScript. The server then generates a response which has structural information, file URIs needed to fill the partitions, and JavaScript needed by the client to process the structural information and file URIs (block 410). Back on the client side 402, the client then compares the ID and file URI of areas in the server's response with IDs/file URIs kept in the client side 402 (block 412). After comparing the ID and file URIs, appropriate data is requested using an XMLHttpRequest command (block 414), which is sent to the server side 404. The server responds (block 416) just as it returned data in FIG. 3 (block 314). The client then updates the proper partition with new data (block 418). The process continues in an iterative manner (query block 420) until the entire next page has been rendered/updated (terminator block 422).

Figure 5:
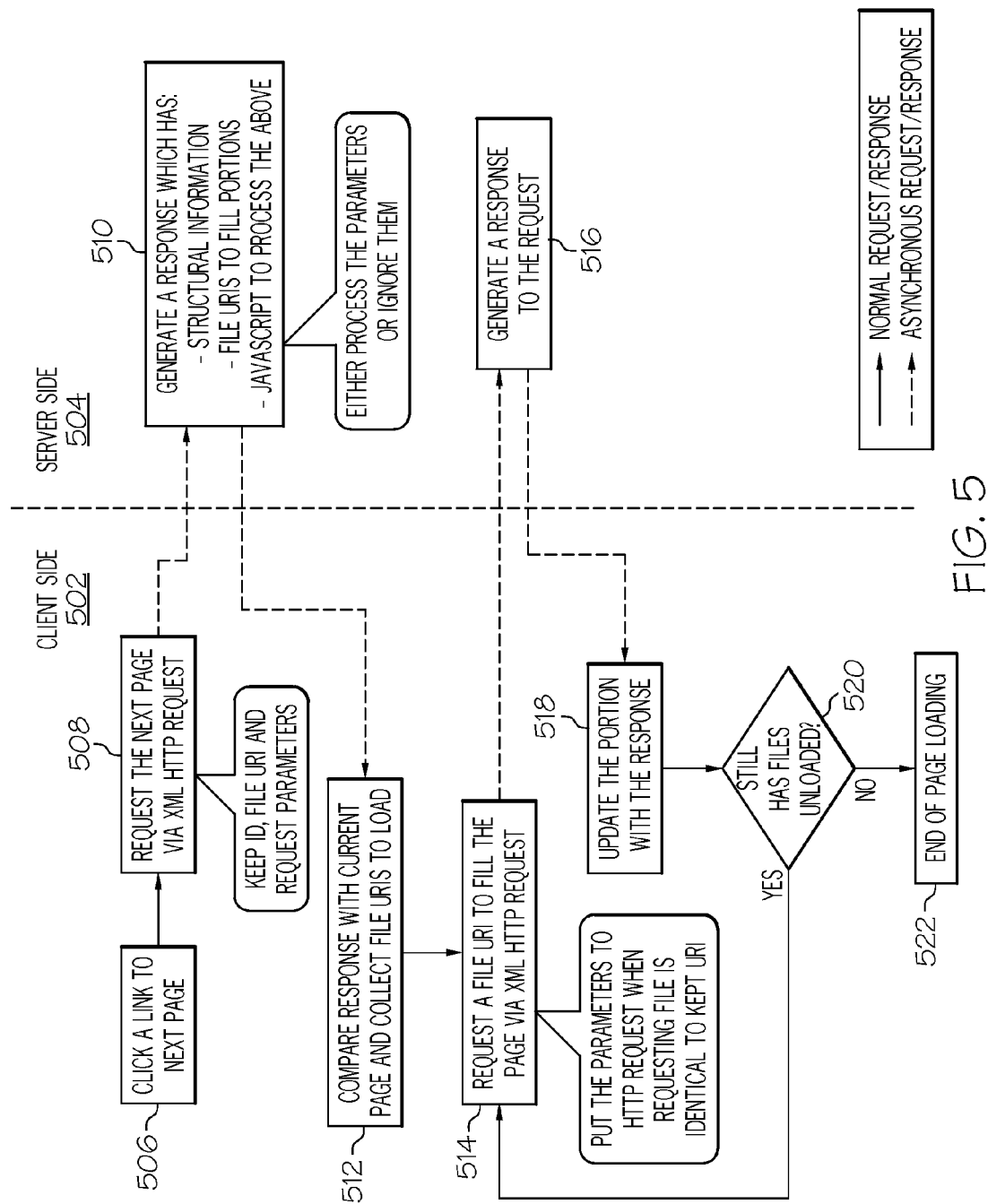
FIG. 5 is a flow-chart illustrating steps taken to process request parameters during page navigation.

In one embodiment, the present AJAX/Page Template system described may incorporate FORM based web applications, such as web commerce sites, web catalog sites, etc. Referring now to FIG. 5, assume that a revised web page is needed because the client changed a request parameter. For example, assume that the client is logging in as a new user, and thus must enter in a new user identifier ("userid") and password. Again, the process works both on a client side 502 and a server side 504. Upon the client clicking a link to a next page (block 506), the client asynchronously requests the next page via an XMLHttpRequest command (block 508). Note that the client keeps the ID, file URI and request parameters locally. The server then generates a response which has structural information, file URIs needed to fill the partitions, and JavaScript needed by the client to process the structural information and file URIs (block 510), preferably by processing the parameters set by the client.

After comparing the response with the current page and collecting file URIs to load (block 512), the client then requests the requisite data for the next page (block 514). If the new web page is the same as the old web page (i.e., has the same URI) but uses a different parameter (e.g., the new userid and password in the example described above), then the new parameters are simply placed into a HyperText Transfer Protocol (HTTP) request (since the URI for the new and old parameters is the same). That is, a single URI can contain data both without the userid and password (e.g., non-secure information), as well as the new userid and new password, thus requiring the client to only submit an HTTP request that is serviced by its browser. A response containing the new data is sent by server to the client (block 516), which uses the new data to update (block 518) the next page until the entire page is updated (query block 520) and the process ends (terminator block 522).

The present invention thus provides numerous novel and unexpected advantages over the prior, including, but not limited to the following. By utilizing the process described herein, annoying page flicker on web pages, particularly those being updated, is eliminated. This problem is particularly insidious when using AJAX alone. Furthermore, since only requested parts need to be updated, application servers are less burdened than they would be using standard prior art, and network traffic is decreased. Also, since each unit of a request gets more granular, the ratio of hit caches improves when the application server does the caching.

Note that the term "partition" as used herein is defined as a portion (or section) of a web page, and does not refer to disk partitioning in which a disk is virtually and/or logically divided into partitions.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer implemented method for rendering a web page on a display device, the method comprising:
   dividing a webpage into multiple empty partitions;
   creating multiple initial pointers for the multiple empty partitions, wherein each pointer locates data that is designated for populating a particular empty partition;
   transmitting the multiple empty partitions to a client;
   transmitting the multiple initial pointers to the client;
   in response to receiving a request from the client for data identified by the multiple initial pointers, transmitting the data to the client, wherein the client creates an initial version of a web page;
   in response to data in the web page changing, updating the multiple initial pointers to create multiple updated pointers;
   transmitting the multiple updated pointers to the client;
   in response to the client determining that a received updated pointer for a specific partition is different from an earlier pointer for the specific partition, receiving a request from the client for changed data located by the received updated pointer; and
   in response to receiving the request from the client for changed data located by the received updated pointer, transmitting the changed data to the client, wherein the client is able to update the initial version of the web page using only changed pointers that point to changed data.

2. The method of claim 1, further comprising:
   transmitting a JavaScript with the multiple updated pointers to the client, wherein the JavaScript is executed by the client to asynchronously send, to a server, the request for changed data located by the received updated pointer.

3. The method of claim 1, wherein the initial version of the web page comprises partitions having data that never changes, and wherein the method further comprises:
   flagging pointers to partitions having data that never changes, wherein pointers for data that populates unchanging partitions are not re-transmitted to the client after the multiple initial pointers are transmitted to the client.

4. The method of claim 1, wherein the multiple empty partitions are transmitted to the client as a HyperText Markup Language (HTML) page in response to an asynchronous Extensible Markup Language Hypertext Transfer Protocol (XML HTTP) Request from the client.

5. The method of claim 1, further comprising:
   creating at least one non-configurable partition for the web page, wherein the web page comprises both configurable empty partitions that are dynamically populated with data and non-configurable partitions whose data set is fixed and permanent.

6. The method of claim 1, wherein the multiple initial pointers and the multiple updated pointers are Uniform Resource Identifiers (URIs).

7. The method of claim 1, wherein the data in the initial web page changed in response to the client changing a parameter for the specific partition of the web page, wherein the parameter identifies a specific data for populating the specific partition of the web page.

8. A system comprising:
   a processor;
   a data bus coupled to the processor;
   a memory coupled to the data bus; and
   a computer-usable medium embodying computer program code, the computer program code comprising instructions executable by the processor and configured for rendering a web page by performing the steps of:
   dividing a webpage into multiple empty partitions;
   creating multiple initial pointers for the multiple empty partitions, wherein each pointer locates data that is designated for populating a particular empty partition;
   transmitting the multiple empty partitions to a client;
   transmitting the multiple initial pointers to the client;
   in response to receiving a request from the client for data identified by the multiple initial pointers, transmitting the data to the client, wherein the client creates an initial version of a web page;
   in response to data in the web page changing, updating the multiple initial pointers to create multiple updated pointers;
   transmitting the multiple updated pointers to the client;
   in response to the client determining that a received updated pointer for a specific partition is different from an earlier pointer for the specific partition, receiving a request from the client for changed data located by the received updated pointer; and
   transmitting the changed data to the client, wherein the client is able to update the initial version of the web page using only changed pointers that point to changed data.

9. The system of claim 8, wherein the initial version of the web page comprises partitions having data that never changes, and wherein the method further comprises:
   flagging pointers to partitions having data that never changes, wherein pointers for data that populates unchanging partitions are not re-transmitted to the client after the multiple initial pointers are transmitted to the client.

10. The system of claim 8, further comprising:
    creating at least one non-configurable partition for the web page, wherein the web page comprises both configurable empty partitions that are dynamically populated with data and non-configurable partitions whose data set is fixed and permanent.

11. The system of claim 8, wherein the multiple initial pointers and the multiple updated pointers are Uniform Resource Identifiers (URIs).

12. The system of claim 8, wherein the data in the initial web page changed in response to the client changing a parameter for the specific partition of the web page, wherein the parameter identifies a specific data for populating the specific partition of the web page.

13. A computer-readable storage medium encoded with a computer program, the computer program comprising computer executable instructions configured for:
    dividing a webpage into multiple empty partitions;
    creating multiple initial pointers for the multiple empty partitions, wherein each pointer locates data that is designated for populating a particular empty partition;
    transmitting the multiple empty partitions to a client;
    transmitting the multiple initial pointers to the client;
    in response to receiving a request from the client for data identified by the multiple initial pointers, transmitting the data to the client, wherein the client creates an initial version of a web page;
    in response to data in the web page changing, updating the multiple initial pointers to create multiple updated pointers;
    transmitting the multiple updated pointers to the client;
    in response to the client determining that a received updated pointer for a specific partition is different from an earlier pointer for the specific partition, receiving a request from the client for changed data located by the received updated pointer; and transmitting the changed data to the client, wherein the client is able to update the initial version of the web page using only changed pointers that point to changed data.

14. The computer-readable medium of claim 13, wherein the initial version of the web page comprises partitions having data that never changes, and wherein the instructions are further configured for:

flagging pointers to partitions having data that never changes, wherein pointers for data that populates unchanging partitions are not re-transmitted to the client after the multiple initial pointers are transmitted to the client.

15. The computer-readable medium of claim 13, wherein the multiple empty partitions are transmitted to the client as a HyperText Markup Language (HTML) page in response to an asynchronous Extensible Markup Language Hypertext Transfer Protocol (XML HTTP) Request from the client.

16. The computer-readable medium of claim 13, wherein the instructions are further configured for:

creating at least one non-configurable partition for the web page, wherein the web page comprises both configurable empty partitions that are dynamically populated with data and non-configurable partitions whose data set is fixed and permanent.

17. The computer-readable medium of claim 13, wherein the multiple initial pointers and the multiple updated pointers are Uniform Resource Identifiers (URIs).

18. The computer-readable medium of claim 13, wherein the data in the initial web page changed in response to the client changing a parameter for the specific partition of the web page, wherein the parameter identifies a specific data for populating the specific partition of the web page.

19. The computer-readable medium of claim 13, wherein the computer-usable medium is a component of a remote server, and wherein the computer executable instructions are deployable to a local client computer from the remote server.

20. The computer-readable medium of claim 13, wherein the computer executable instructions are capable of being provided by a service provider to a customer on an on-demand basis.

* * * * *